US009457425B2

(12) United States Patent
Paulus (10) Patent No.: US 9,457,425 B2
(45) Date of Patent: Oct. 4, 2016

(54) GLAZING WITH FREQUENCY SELECTIVE COATING (75) Inventor: Peter Paulus, Muenster (DE)

(73) Assignee: PILKINGTON GROUP LIMITED, Lancashire (GB)

( * ) Notice: Subject to any disclaimer, the term of this patent is extended or adjusted under 35 U.S.C. 154(b) by 393 days.

(21) Appl. No.: 13/885,990

(22) PCT Filed: Nov. 16, 2011

(86) PCT No.: PCT/GB2011/052231
§ 371 (c)(1),
(2), (4) Date: Jul. 24, 2013

(87) PCT Pub. No.: WO2012/066324
PCT Pub. Date: May 24, 2012

(65) Prior Publication Data
US 2013/0295300 A1 Nov. 7, 2013

(30) Foreign Application Priority Data
Nov. 19, 2010 (GB) .................................. 1019601.2

(51) Int. Cl.
B05D 3/06 (2006.01)
B23K 26/00 (2014.01)
B23K 26/08 (2014.01)
C03C 17/36 (2006.01)
H01Q 1/12 (2006.01)
H01Q 15/00 (2006.01)
B23K 26/40 (2014.01)

(52) U.S. Cl.
CPC ....... B23K 26/0066 (2013.01); B23K 26/0084 (2013.01); B23K 26/082 (2015.10); B23K 26/0876 (2013.01); B23K 26/364 (2015.10); B23K 26/40 (2013.01); C03C 17/366 (2013.01); H01Q 1/1271 (2013.01); H01Q 15/0013 (2013.01); B23K 2201/18 (2013.01); B23K 2201/34 (2013.01); B23K 2203/08 (2013.01); B23K 2203/50 (2015.10); C03C 2218/328 (2013.01)

(58) Field of Classification Search
CPC ................................ C23C 16/483; B05D 3/06
See application file for complete search history.

(56) References Cited

U.S. PATENT DOCUMENTS

| 3,742,182 | A | | 6/1973 | Saunders | |
|---|---|---|---|---|---|
| 4,935,264 | A | * | 6/1990 | Tsujino | B29C 41/28 118/323 |
| 5,650,249 | A | * | 7/1997 | Dull | C23F 1/02 343/708 |
| 6,054,192 | A | | 4/2000 | Otsuka et al. | |
| 6,066,830 | A | * | 5/2000 | Cline et al. | 219/121.69 |
| 6,122,564 | A | * | 9/2000 | Koch | B22F 3/1055 700/123 |
| 6,356,236 | B1 | | 3/2002 | Maeuser et al. | |
| 2004/0107641 | A1 | * | 6/2004 | Walton | E06B 7/28 49/50 |
| 2004/0113860 | A1 | | 6/2004 | Walton | |
| 2005/0247470 | A1 | * | 11/2005 | Fleming | H05K 9/0094 174/394 |
| 2006/0108336 | A1 | * | 5/2006 | Fang | B23K 26/365 219/121.69 |
| 2006/0152421 | A1 | * | 7/2006 | Baranski | B32B 17/10036 343/713 |
| 2006/0175301 | A1 | | 8/2006 | Rippl | |
| 2008/0038677 | A1 | * | 2/2008 | Hogue | G03F 1/14 430/325 |
| 2010/0243427 | A1 | * | 9/2010 | Kozlowski | C03C 17/3417 204/192.1 |
| 2011/0170030 | A1 | * | 7/2011 | Boote | E06B 9/24 349/41 |
| 2012/0033287 | A1 | * | 2/2012 | Friedman | C03C 17/34 359/275 |
| 2012/0062346 | A1 | * | 3/2012 | McKinzie, III | H01P 1/16 333/251 |
| 2012/0256798 | A1 | * | 10/2012 | Paulus | H01Q 13/10 343/713 |

FOREIGN PATENT DOCUMENTS

| EP | 08039644 A1 | 5/1998 |
|---|---|---|
| FR | 2923076 A1 | 5/2009 |
| JP | 2007-307723 A | 11/2007 |

OTHER PUBLICATIONS

Ullah, Irfan, et al., "Transmission Improvement of UMTS and Wi-Fi Signals through Energy Saving Glass Using FSS". Wireless and Microwave Technology Conference (WAMICON), 2011 IEEE 12th Annual; Apr. 18-19, 2011, pp. 1-5.*

Bertoni, Henry L., et al., "Frequency-Selective Reflection and Transmission by a Periodic Dielectric Layer". IEEE Transactions on Antennas and Propagation, vol. 37, No. 1, Jan. 1989, pp. 78-83.*

(Continued)

Primary Examiner — Bret Chen
(74) Attorney, Agent, or Firm — Buchanan Ingersoll & Rooney PC (57) ABSTRACT A method of manufacturing a glazing having a frequency selective surface comprising the steps of:
a) depositing a coating on a substrate, said coating being non-transmitting to radio frequency (RF) radiation;
b) providing a laser beam and
c) removing a portion of the coating by laser ablation to form one or more curves and/or lines having a spacing selected to provide transparency of the coating to RF radiation of a desired wavelength;
characterized by
d) directing the laser beam and/or moving the substrate such that the relative motion of the intersection of the laser beam and the coating, with respect to the substrate, comprises motion in a first dimension, wherein said motion is simultaneously superimposed with a reciprocating motion in a second dimension;
e) translating said intersection in the second dimension; and
f) repeating at least step d) out of steps d) to f).

4 Claims, 6 Drawing Sheets (56) References Cited

OTHER PUBLICATIONS

Singh, D, et al., "Analysis of Frequency Selective Surfaces for Radar Absorbing Materials". Progress in Electromagnetics Research B, vol. 38, 297-314, 2012.*
Search Report dated Mar. 18, 2011, issued in corresponding GB Application No. GB 109601.2. (1 pg).
International Search Report (PCT/ISA/210) issued on Mar. 1, 2012, by the European Patent Office as the International Searching Authority for International Application No. PCT/GB2011/052231.
Communication Persuant to Article 94(3) EPC dated Sep. 9, 2014, issued in corresponding European Patent Application No. 11 794 215.1-1702 (5 pages).

* cited by examiner

GLAZING WITH FREQUENCY SELECTIVE COATING

The invention is concerned generally with provision of a surface on a coated substrate, which has frequency selective transmission characteristics and, in some embodiments, to providing such a surface on glazing sheets having a solar control coating deposited thereon.

In glazing for buildings and automotive applications, antennas for reception and, or transmission of radio frequency (RF) waves are commonly incorporated. These may be realised as, for example, conductive films deposited on the glazing or metal wires or strips attached thereto. In laminated glazings, which typically comprise two or more glass sheets bonded by a polymer interlayer, the antennas might be located within the laminate i.e. within the interlayer or on a glass surface contacting the interlayer.

In addition, in many cases additional equipment is operated within the vehicle or the building, which radiates and/or receives radiofrequency signals. To ensure function of this equipment, sufficient transmittance through the glazing is necessary.

Although glazing sheets, particularly for automotive applications, are predominantly formed in glass, other materials such as polycarbonates are known and references to glass throughout this application should not be regarded as limiting.

In order to reduce the accumulation of heat in the interior of a building or vehicle, a glazing sheet may be coated with a solar control film that absorbs or reflects solar energy. Inclusion of solar control films, particularly on glazings for use in warm, sunny climates, is desirable because they reduce the need for air conditioning or other temperature regulation methods. This affords savings in terms of energy consumption and environmental impact.

Such films, however, are typically electrically conductive and can also reflect RF waves. This effect impedes reception or transmission by antennas.

A simple approach to this problem of RF energy reflection is to remove the solar control film in the region of the glazing near the antenna. This approach, however, reduces the solar control benefits offered by the glazing and for equipment located inside the vehicle or the car, the region would be unacceptably large.

Another solution has been to cut slits in the solar control film to create a surface which is frequency selective, that is, it has relatively high reflectivity/absorbance for solar energy but relatively low in the RF region of the electromagnetic spectrum. The cutting may be performed by laser ablation and the spacing of the slits is chosen to provide selectivity at the desired frequency.

By one approach a series of horizontal and vertical lines are cut in the film to produce a grid pattern. By appropriate choice of the line spacing, a grid can be produced that is transparent to RF waves but substantially reflecting or absorbing to solar energy.

The lines are typically cut by laser marking using a 'galvo-head', that is a system in which the direction of a cutting laser beam is controlled by deflecting a rotatable mirror or mirrors using a galvanometer based motor. This arrangement allows the direction of the laser to be controlled and changed rapidly but is limited in terms of the working field (i.e. the area over which a grid can be cut).

The greater the distance, f, between the laser and the substrate, the greater the size of the working field. However, increasing f increases the diameter D of the focussed laser which in turn increases the line width in the grid. Lines of increased width require higher laser energy and are more noticeable to the eye.

Using the prior art approach, grids of up to about 300 mm in height and width are practical. This is adequate for small antennas for devices such as toll monitoring systems but there is an increasing demand, in the automotive industry in particular, for antennas extending across the majority of the glazing.

One approach to meeting this demand has been to combine a number of grids, each corresponding with the working field of the laser. Thus a grid is cut and then the glazing sheet repositioned relative to the laser so that the next grid is cut alongside the previous one. The process is repeated until the required area of the glazing is covered by a large grid comprised of a number of merged smaller grids.

A number of problems are associated with this approach however. First, the repeated repositioning of the glazing sheet is time consuming and introduces a delay to the production process.

Second, while the grid patterns must be positioned very accurately, it is necessary to avoid any conductive regions between them. This is achieved by arranging for a slight overlap between adjacent grids but that in turn gives rise to an undesireable visual effect: the boundaries between adjacent grids are emphasised by the misalignment and this is displeasing aesthetically and visually distracting.

Another (general) approach to achieving laser cut patterns over a relatively large area is to mount the laser on an X-Y plotter, many examples of which are known in the art. Such an arrangement provides a means of directing the laser over a larger working area but its use is limited by its speed of operation. In order to cover a major portion of (for example) an automobile backlight with laser cuts having the requisite spacing, a significant number of stops, starts and turns is necessary.

It is also noted that the straight horizontal and vertical lines in a grid arrangement are more noticeable to the human eye and produce a pattern that is less aesthetically pleasing and more visually distracting than one based on curves or loops.

There remains a requirement for a means of rapidly producing a laser cut pattern over the majority of a glazing sheet such as employed in a building or automobile glazing unit. According to the invention, this requirement is met by the method according to claim 1 and the apparatus according to claim 5 appended hereto.

The invention is based on the resolution of the laser motion into two components, conveniently two orthogonal components designated as X and Y. Thus, one component can be realised as sweeps of the laser across the width of the glazing sheet (in the X dimension), while the other component can be realised as motion in the Y dimension over a relatively short distance. Combination of these two components produces a two-dimensional undulating pattern.

The invention will now be described, by non-limiting example, with reference to the following figures in which.

Figure 1A:
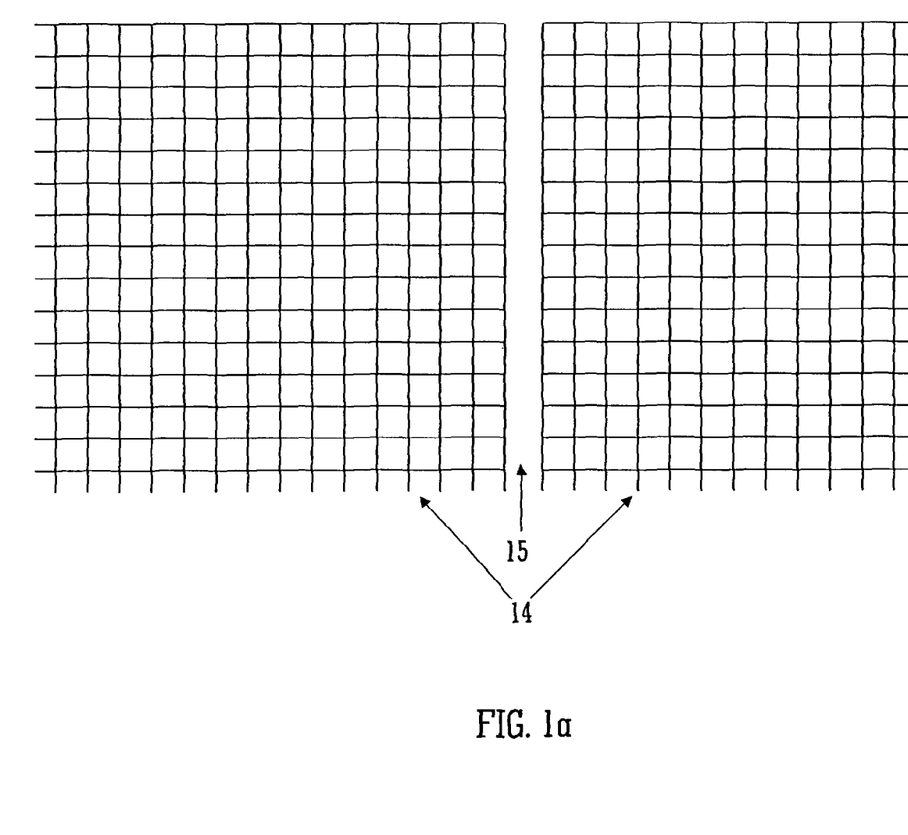
FIGS. 1a and 1b illustrate some of the problems associated with prior art approaches to providing a frequency selective coating across a large area of a glazing.
Figure 1B:
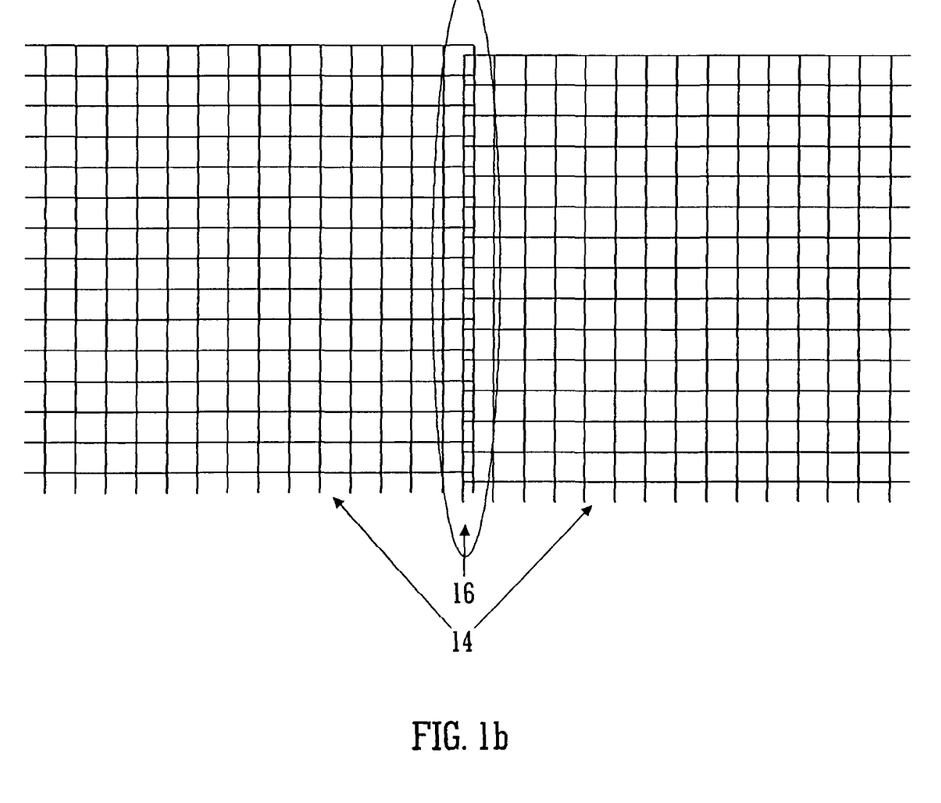

Referring to FIG. 1a, in order to ensure satisfactory transmittance across the whole of a region of a coated glazing, covered by a plurality of grid patterns 14, it is necessary to avoid any uncut, conductive regions 15 between adjacent grids. This is achieved by arranging for a slight overlap between adjacent grids (FIG. 1b) but the region of overlap 16 is visually striking and gives rise to an appearance that is aesthetically displeasing and distracting to a viewer.

Figure 2:
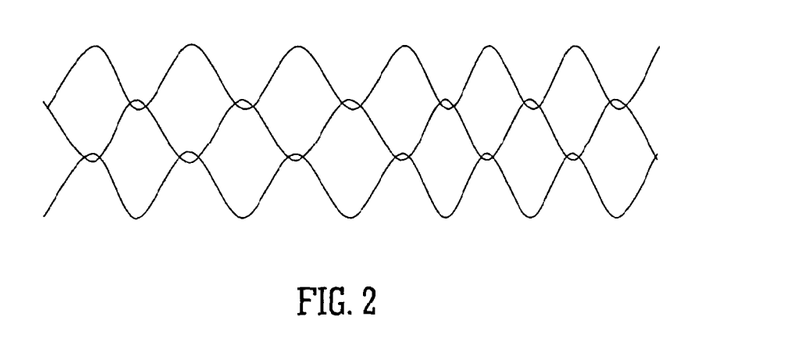
FIGS. 2 and 3 illustrate examples of cutting patterns applied to frequency selective coatings according to the invention.

FIG. 2 illustrates a typical pattern of cutting in a glazing coating according to the invention. The X component of the laser motion comprises a series of relatively long sweeps in the X dimension across the width of the glazing sheet. A reciprocating motion in the Y dimension is superimposed on this motion in the X dimension to provide an undulating, wave-like pattern. By this approach, the coating over the whole of the glazing can be cut with a pattern having both horizontal (X) and vertical (Y) components, with few stops in the laser journey.

Note that in order to provide more effective RF transparency, the undulating lines touch or overlap.

Figure 3:
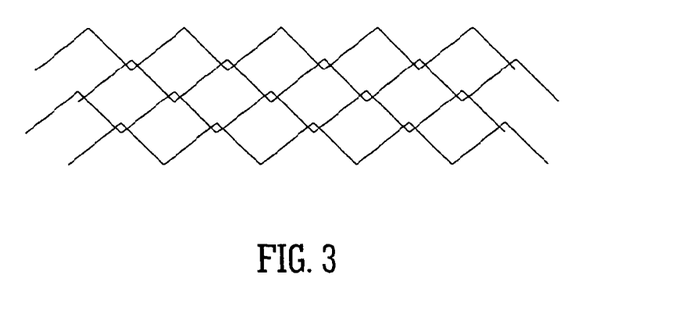

FIG. 3 illustrates an alternative pattern of cutting according to the invention. Again, the cut pattern includes both X and Y components.

Figure 4:
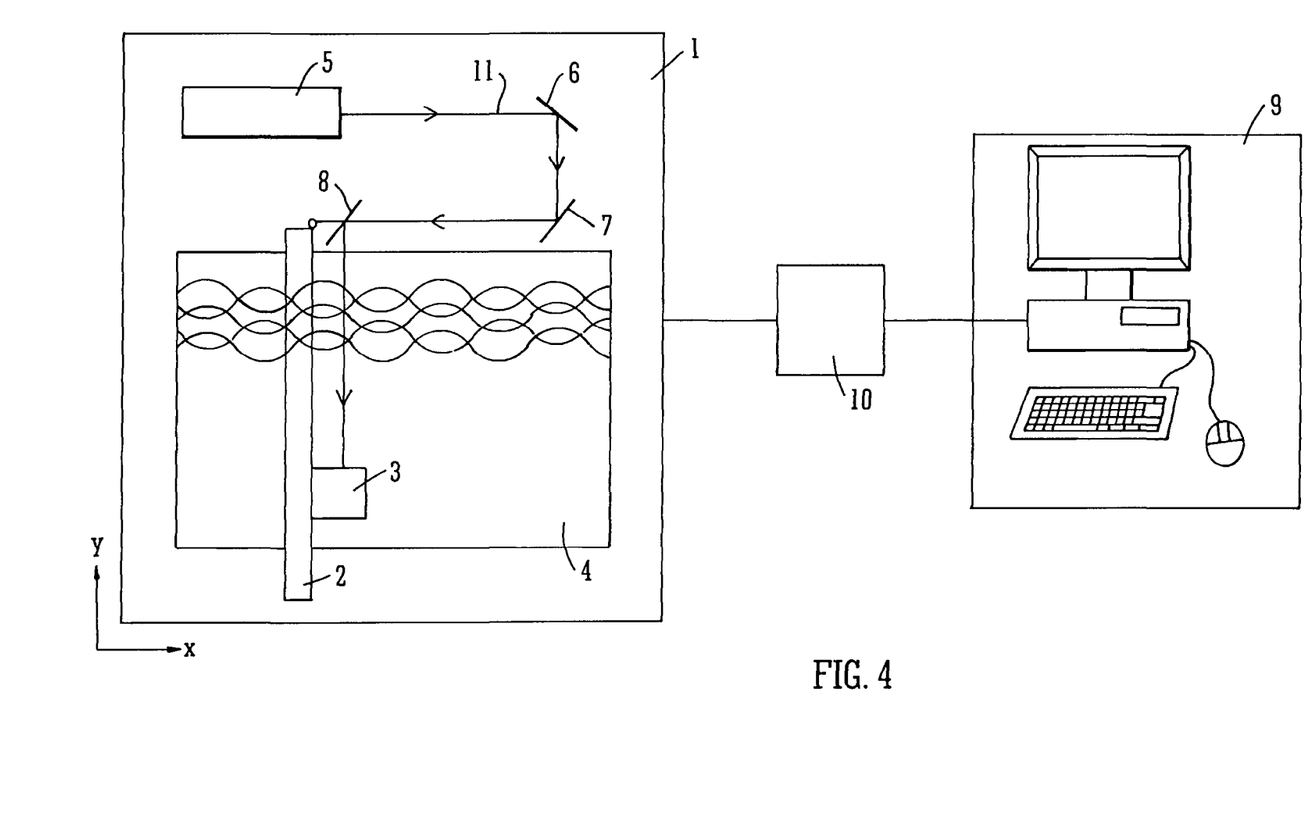
FIG. 4 shows an embodiment of the invention.

Referring to FIG. 4, a simple embodiment of the invention comprises a conventional X-Y plotter, adapted to direct a laser beam 11, and suitably programmed to provide a cut pattern according to the invention.

The apparatus, generally designated 1, thus comprises a gantry 2 moveable in the X dimension by a combination of stepper motor, pulleys and drive belts (not shown) which may be suitably arranged by a person skilled in the art without further instruction here. A mirror 3 is mounted on gantry 2 and is moveable in the Y dimension by another stepper motor/pulley/drive belt arrangement, also not shown. Thus, the position of mirror 3 over a substantial part of glazing 4 may be controlled. In practice the mirror would typically fixed to a carriage (not shown), the latter being mounted on the gantry and moveable thereon.

A laser source 5 provides a laser beam 11 which is directed via a set of mirrors 6, 7, 8 and 3 on to glazing 4. Mirrors 6 and 7 are fixed in a plane perpendicular to the plane of glazing 4; mirror 8 moves with gantry 2 but remains perpendicular to the plane of glazing 2 and arranged to direct the laser beam 11 on to mirror 3. Mirror 3 lies in a plane which intersect the plane of glazing 4 and is arranged to direct the laser beam 11 thereto.

Hence the laser beam 11 may be directed to any point over a substantial part of glazing 4 by appropriate movement of gantry 2 in the X dimension and mirror 3 in the Y dimension.

The arrangement of mirrors shown in FIG. 4 is one example only: other arrangements for directing the laser beam to the glazing are possible.

Machine readable instructions (a program) to determine the movement of mirror 3 are stored and executed by a computer 9 and a controller 10 converts signals produced by computer 9 to electrical signals suitable for driving the stepper motors.

Computer 9 is typically a microprocessor based system which may be realised as a desktop or laptop or may be integrated with the rest of the apparatus.

Computer 9 is loaded with a program which causes gantry 2 to move in a series of sweeps in the X dimension across glazing 4. During each sweep, the program causes the mirror to execute a reciprocating motion in the Y dimension, centred on a point $P_y$ which is one of a series of points $P_0$-$P_n$ distributed along gantry 2. Between each sweep of the gantry, y is incremented i.e. the mirror moves in the Y direction to be ready to reciprocate about the next point in the series.

The system could be arranged such that the laser performs the cutting action during movement in one sense (e.g. left to right) with the mirror advancing to the next point $P_y$ while the gantry resets to the left side of the glazing in preparation for the next sweep. Alternatively, the laser could perform the cutting action during movement in both senses (left to right and right to left) with the mirror advancing while the gantry stops at each end of the working field.

The sinusoidal pattern suggested in FIG. 4 is achievable by programming the apparatus to move the gantry 2 at a constant speed in the X dimension and superimposing a simple harmonic motion on the mirror 3 in the Y dimension. Appropriate choice of the relative phase of motion between sweeps allows the 'peaks' of a given sweep to be aligned with the 'troughs' of adjacent sweeps. It will be apparent to those skilled in the art that other patterns are achievable.

The embodiment of the invention illustrated in FIG. 4 offers advantages over the prior art by eliminating the need for sweeps in the Y dimension. Aesthetically displeasing and visually distracting straight lines are also avoided.

Nevertheless, the embodiment illustrated in FIG. 4 is limited by the capabilities of a conventional X-Y plotter. In particular, the reciprocating motion in the Y direction still requires relatively fast and frequent stops and changes of direction and this requirement may not be met by the stepper motor based systems of the prior art.

In a preferred embodiment, further means for realising the vertical component of the cut pattern is introduced. The further means is operable independently of the stepper motors of the X-Y plotter and is capable of more rapid motion, stops and changes of direction.

Figure 5A:
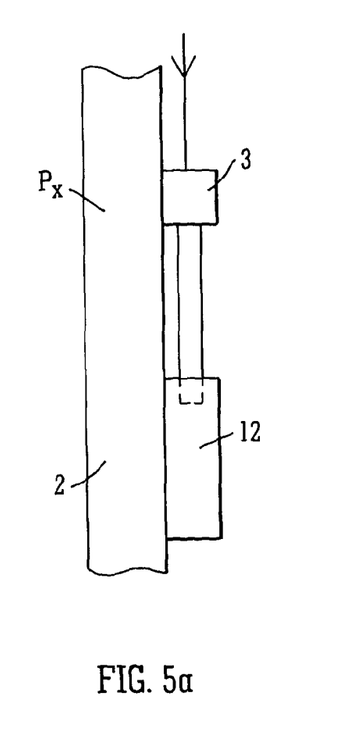
FIGS. 5 and 6 show examples of means for achieving a component of the laser beam motion according to the invention.
Figure 5B:
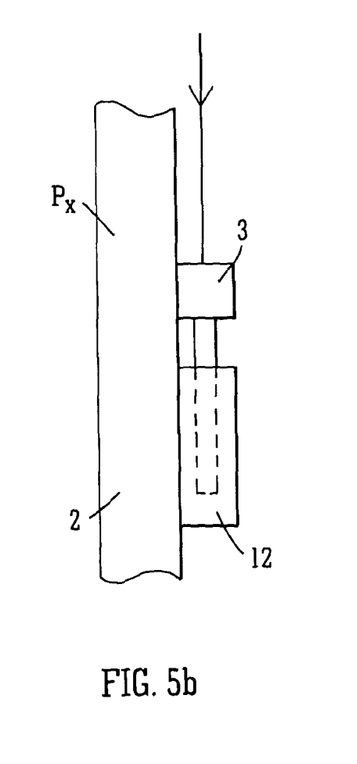
Figure 6A:
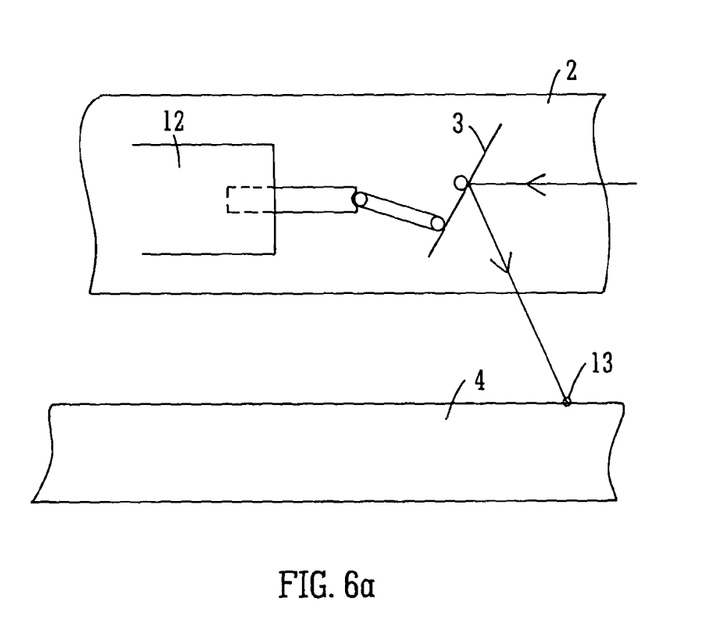
Figure 6B:
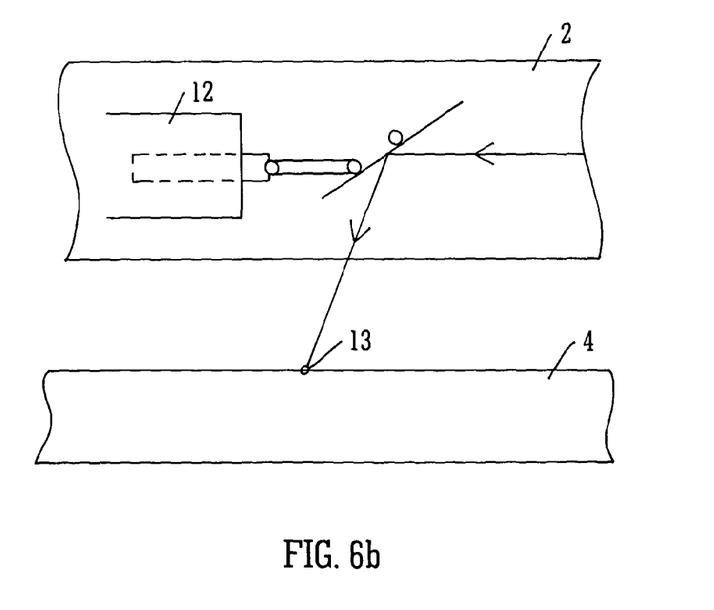

Referring to FIGS. 5a and 5b, the further means for introducing the vertical component of the pattern may comprise an actuator 12 (e.g. electro-mechanical or pneumatic) mounted on the gantry 2. The actuator is operable to move mirror 3 in the Y dimension, between two positions, relative to the gantry 3 while the gantry sweeps across the glazing 4 in the X dimension. It should be noted, that the Y stepper motors of the X-Y plotter still ensures the change of average y-position $P_y$ from one horizontal sweep to the next Referring to FIGS. 6a and 6b, as an alternative to moving mirror 3, the mirror may be rotated between two orientations such that the angle of the laser beam reflecting from the mirror 3 oscillates and the intersection 13 between the laser beam and the glazing 4 varies in the Y direction while the gantry 2 sweeps in the X direction (X direction being perpendicular to the plane of the page).

As an alternative to actuator 12, mirror 3 may be moved or rotated using a galvo-head.

It should be noted that while the invention has been described and illustrated with reference to 'X' and 'Y' dimensions, these designations are arbitrary. The invention may be worked by performing a series of sweeps of the laser across the glazing in any (first) dimension and superimposing on this motion a second, cyclic, motion of the laser or laser beam where the second motion has a component in a second dimension, different from the first dimension. Of course, the first and second dimensions most conveniently lie in the plane of the glazing.

It also should be noted that sweeps themselves do not need to be straight lines, according to design (aesthetic) requirements these sweeps can be curved lines, realised by the X-Y capabilities of the plotter.

The term 'X-Y' plotter has been exemplified by 'gantry and carriage' based systems but this should not be seen as limiting and the invention may be realised by other means of controlling the position of an object in two dimensions, for example, a robotic arm.

It also is possible to achieve the relative motion between the laser beam and the coated glazing, wholly or in part, my moving the glazing. This may be achieved by mechanical engineering design solutions that are within the knowledge of a skilled person and require no further description here.

Moreover, in the examples shown, the laser beam is directed by a series of mirrors which may be combined with other optical elements such as lenses. Nevertheless, other means for directing the laser, such as a fibre optic cable, may be employed.

It is possible to use more than one mirror 3 (together with actuator 12) or more than one fibre outlet of a Laser, in order to scribe more than one line in parallel to the glass.

The invention claimed is:

1. A method of manufacturing a glazing having a frequency selective surface comprising the steps of:
   a) depositing a coating on a substrate, said coating being non-transmitting to radio frequency (RF) radiation;
   b) providing a laser beam; and
   c) removing a portion of the coating by laser ablation to form lines in the coating having a spacing selected to provide transparency of the coating to RF radiation of a desired wavelength;
   wherein
   d) directing the laser beam and/or moving the substrate such that the relative motion of the intersection of the laser beam and the coating, with respect to the substrate, comprises motion in a first dimension, wherein said motion is simultaneously superimposed with a reciprocating motion in a second dimension;
   e) translating said intersection in the second dimension; and
   f) repeating at least step d) out of steps d) to e) to produce said lines in the coating, said lines in the coating being undulating lines that touch or overlap.

2. A method according to claim 1, where the reciprocating motion comprises a simple harmonic motion.

3. A method according to claim 1, where the reciprocating motion occurs at a constant speed.

4. A method according to claim 1, where the first dimension and the second dimension are substantially perpendicular to each other.

* * * * *